A. L. McGREGOR.
AUTOMOBILE BUMPER.
APPLICATION FILED JAN. 17, 1921.
1,372,152.
Patented Mar. 22, 1921.
2 SHEETS—SHEET 1.
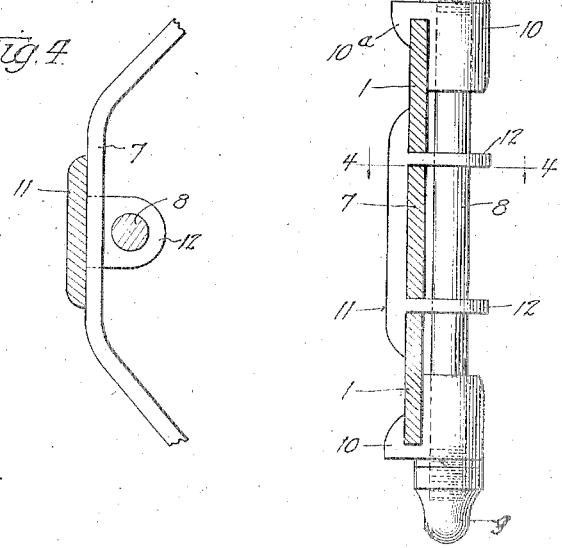
Inventor.
Allan L. McGregor.

A. L. McGREGOR.
AUTOMOBILE BUMPER.
APPLICATION FILED JAN. 17, 1921.
1,372,152.
Patented Mar. 22, 1921.
2 SHEETS—SHEET 2.
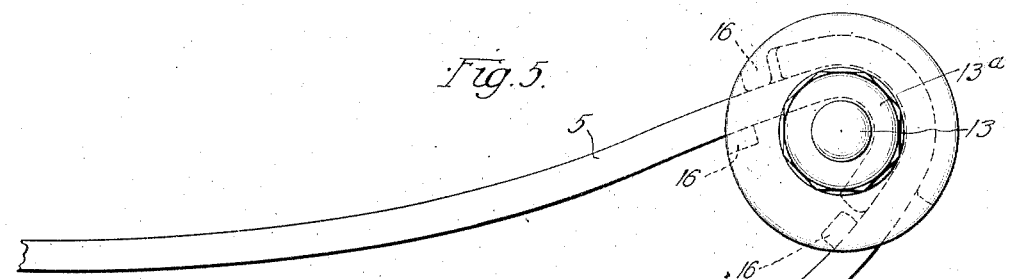
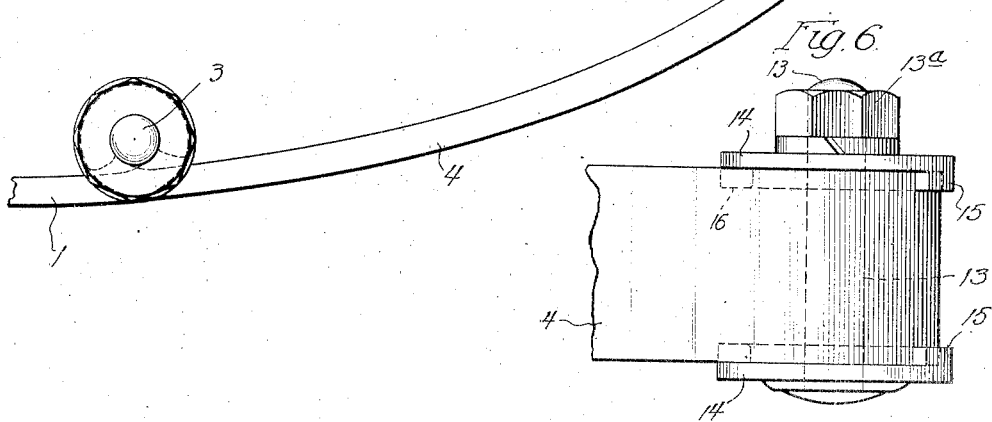
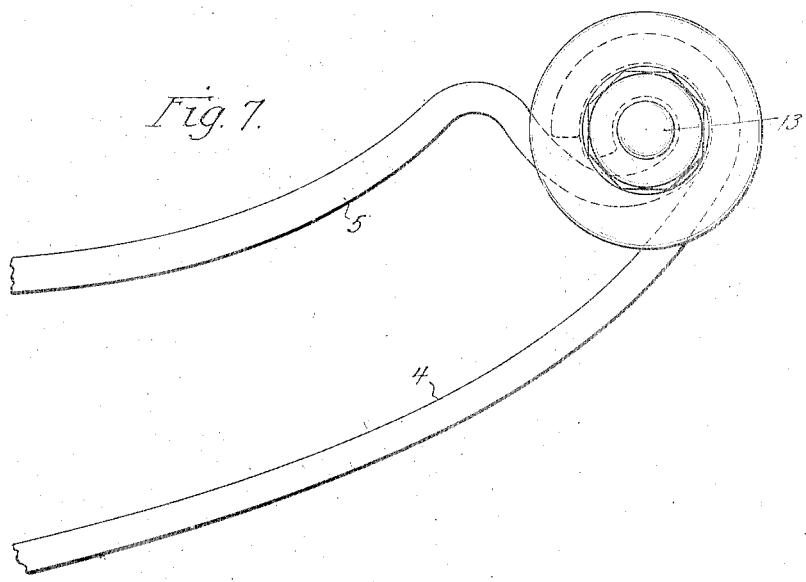
Inventor.
Allan L. McGregor.
By:

UNITED STATES PATENT OFFICE.

ALLAN L. McGREGOR, OF CHICAGO, ILLINOIS.

AUTOMOBILE-BUMPER.

1,372,152.  Specification of Letters Patent.  Patented Mar. 22, 1921.

Application filed January 17, 1921. Serial No. 437,732.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to bumpers of the resilient bar type including, in addition, a wide impact section extending throughout the central portion of the bumper.

In common with all bumpers of this character, the object of the invention is to provide a structure which will afford ample protection to a motor vehicle in the event of collision, and at the same time having sufficient strength and rigidity to resist the permanent distortion of the bumper under the impact. The desirable features are obtained, for the most part, by designing and assembling the parts so as to promote the equal distribution of the shock throughout the bumper structure, and that degree of resiliency calculated to absorb the maximum amount of the shock which otherwise would be transmitted to the vehicle. The bumper embodying the features of the present invention is a type which exhibits these characteristics.

The drawings, which may be referred to in the following discussion, may be briefly described as follows:

Figure 1 is a top plan view of the bumper as attached to the frame of a motor vehicle, Fig. 2 is a view in front elevation of the bumper, Fig. 3 is an enlarged detail view in vertical section, taken on line 3, 3 of Fig. 2, Fig. 4 is a detail view in cross-section, taken on line 4, 4 of Fig. 3, Fig. 5 is an enlarged detail view in top plan of one end of the bumper, Fig. 6 is an enlarged detail view in front elevation showing the hinge connection employed at the end of the bumper, and Fig. 7 is an enlarged detail view similar to Fig. 5 showing a modification of the hinge connection, illustrated in Figs. 5 and 6.

In its general structure the bumper comprises a front impact member consisting of a central impact section A, made up of two parallel bars spaced apart vertically, end sections B, B extending laterally beyond the ends of the central impact section A and forming the outer U-shaped extremities of the bumper, and a secondary bar C extending the length of the bumper, to the rear of the impact member and forming a reinforcing member therefor. The complete structure is attached to the frame members D, D of the vehicle through the medium of suitable attaching brackets F, E, having direct connection with the rear bar C.

Referring now more in detail to the various parts of the bumper already described, the central impact section A is made up of two parallel bars 1, 1 which are spaced apart one above the other and joined together at their ends by means of vertical pins 2, 2 which engage eyes formed at the ends of said bars, these pins being provided at their ends with screw caps or nuts 3 which are removable for the purpose of assembling or disassembling the structure. Connected with the pins 2, 2 and intermediate the ends of the bars 1, 1 are single bars 4, 4 of comparatively short length which extend outwardly and rearwardly to the extreme ends of the bumper and form the front portions of the end sections B, B. The inner ends of the bars 4 are bent in the form of eyes which surround the pins 3, 3 intermediate the ends of the bars 1, 1, as clearly shown in Fig. 5. Thus the connection between the central impact section A and end sections B is relatively flexible inasmuch as the adjacent ends of the bars 1 and 4 have pivotal connection with the pins 3.

As before suggested, the secondary bar C extends the full width of the bumper, being spaced for the most part rearwardly of the central impact section A. The free ends of the member C are connected to the outer ends of the bars 4, 4 in a manner hereinafter to be described in detail, and moreover are bent or shaped in the following manner: Intermediate its outer extremities and the points of connection with the brackets E, E, the bar is convex in a forwardly direction, as at 5, 5, thus forming the rear portion of the end sections B, B. Throughout portions immediately adjacent and having connection with the brackets E, E, the bar assumes a parallel relation with the central impact section for a short distance, as at 6, 6, whereupon the bar is bent in V-shape and forwardly toward the central impact section so that the apex of the V-shaped portion 7 terminates midway between the end of the central impact section A and in the vertical plane thereof. At this point a connecting member, clearly shown in Fig. 3, is mounted, the same acting to tie the apex of the V-shaped portion 7 to the bars 1, 1 of the central impact section A. This connecting member comprises a pin 8 similar in all respects to the pins 3, 3, and extends vertically immediately to the rear of the bars 1, 1. As before, the ends of the pin 8 are surmounted by removable screw caps 9, 9, and carried upon the pin are blocks 10, 10 which occupy positions adjacent the ends of the pin and are provided with recessed lugs 10ª in the nature of hooks which engage the outer edges of the bars 1, 1. Likewise, there is mounted on the pin 8 and intermediate the blocks 10, 10 the vertical locking plate 11 provided with integral ears 12, 12 which extend between the edges of the bar 7 and those of the bars 1, 1, said ears being provided with apertures through which the pin 8 extends, as clearly shown in Fig. 4. The ends of the plate 11 overlap the bars 1, 1, thus performing the function of anchoring the said bars 1, 1 as well as securely tying the portion 7 of the bar C at the central point of the impact section A.

Referring now in detail to the manner in which the outer ends of the bars 4, 4 are connected with the corresponding ends of the rear member C, the extremities of these bars are bent in U-shape, as clearly shown in Fig. 5, these U-shaped extremities having overlapping engagement with each other, the end of the innermost bar 4 partially surrounding a short hinge bolt 13. Mounted upon the bolt 13 and bearing flatwise against the upper and lower edges of the bars is a pair of annular plates 14, 14 provided with integral peripheral flanges 15 extending throughout the portion of disks adjacent the U-shaped extremity of the outermost bar. In addition to the flanges 15, the plates 14 are provided with integral lugs 16 which project from the under surface of the plates and engage the opposed inner faces of the bars. These plates being securely clamped together by means of the bolt 13 and the nut 13ª mounted at one end thereof the ends of the bars are pivotally connected together and in overlapping engagement by means of the flanges 15, 15 and the lugs 16, the latter serving as stops to prevent sliding movement between the overlapping ends of the bars in one direction, thus providing in effect a limited yieldable connection at the ends of the bumper, permitting the contraction of the U-shaped ends under impact but dampening the reaction in the opposite direction.

In Fig. 7 a modified construction is illustrated which may be equally well employed for the purpose of connecting the bars together at the ends of the bumper. In this construction the same arrangement of bolt and plates are used as before, although the extremities of the bars are treated in somewhat different manner, namely, the ends of the bars are curved in the same direction instead of passing around the bolt in opposite directions, as shown in Fig. 5, otherwise the modified construction is similar to and provides the same type of connection as the one heretofore described in connection with Figs. 5 and 6.

A bumper constructed in this manner has all the shock absorbing qualities desired, not only by reason of the inherent qualities of the material but also because of the manner in which the several parts are assembled. It is to be observed that the central impact section is in reality a unit in itself, being pivotally supported by means of the relatively short bars 4, 4 forming a part of the end sections B. To avoid excessive degree of resiliency throughout the central part of the bumper, the rear member or bar C is brought forward and secured at the center of said impact section, the two inclined arms of the V-shaped portion 7 providing braces or truss bars affording increased resistance against impacts received by the central impact section and serving to distribute the impact uniformly throughout the entire structure. Furthermore, the V-shaped portion 7 partially closes the space separating the bars 1, 1 of the impact section thus preventing the passage of objects between the bars 1, 1, which might otherwise strike the parts of the vehicle immediately behind the impact section.

Having described the device of the invention, I claim as new and novel:

1. In a bumper, the combination of an impact section, end sections pivotally connected with the ends of said impact section, a bar spaced rearwardly from said impact section and connected at its ends to the end sections, and having its central portion offset forwardly and connected with said impact section intermediate the ends thereof.

2. In a bumper, the combination of a central impact section, end sections pivotally connected with the ends of said impact section, a bar spaced rearwardly from said impact section and connected at the end of the bumper to the end sections, and having its central portion offset forwardly in V-shape and connected at its apex with said central impact section.

3. In a bumper, the combination of a central impact section, comprising bars spaced apart vertically, end sections comprising relatively short bars pivotally connected between the bars of said impact section, and a bar spaced rearwardly of said impact section and extending between the outer ends of said end sections.

4. In a bumper, the combination of a central impact section, comprising bars spaced apart vertically, end sections comprising relatively short bars pivotally connected between the bars of said impact section, and a bar spaced rearwardly of said impact section and pivotally connected with the outer ends of said end sections.

5. In a bumper, the combination of a pair of parallel and vertically spaced bars forming a central impact section, pins connecting the ends of said bars, single bars forming the end sections of the bumper and pivotally connected to said pins between the ends of the bars of said impact section, and a reinforcing bar pivotally connected to the ends of said single bars and fixed at its central portion between the bars of said central impact section.

6. In a bumper, the combination of a central impact section comprising vertically spaced bars, pins extending through eyes formed at the ends of said bars, single bars pivotally connected with said pins and extending outwardly to the ends of the bumper, and a rearwardly disposed bar pivotally connected with the ends of said single bars, and extending inwardly and connected with the vehicle frame, the portion of said bar intermediate the points of connection extending in V-form toward the central portion of said impact section and fixed at its apex between the bars thereof.

In witness whereof, I hereunto subscribe my name this 11th day of January, A. D., 1921.

ALLAN L. McGREGOR.